No. 833,157.  
PATENTED OCT. 16, 1906.
C. J. DORSEY.  
TOY.  
APPLICATION FILED OCT. 20, 1904.
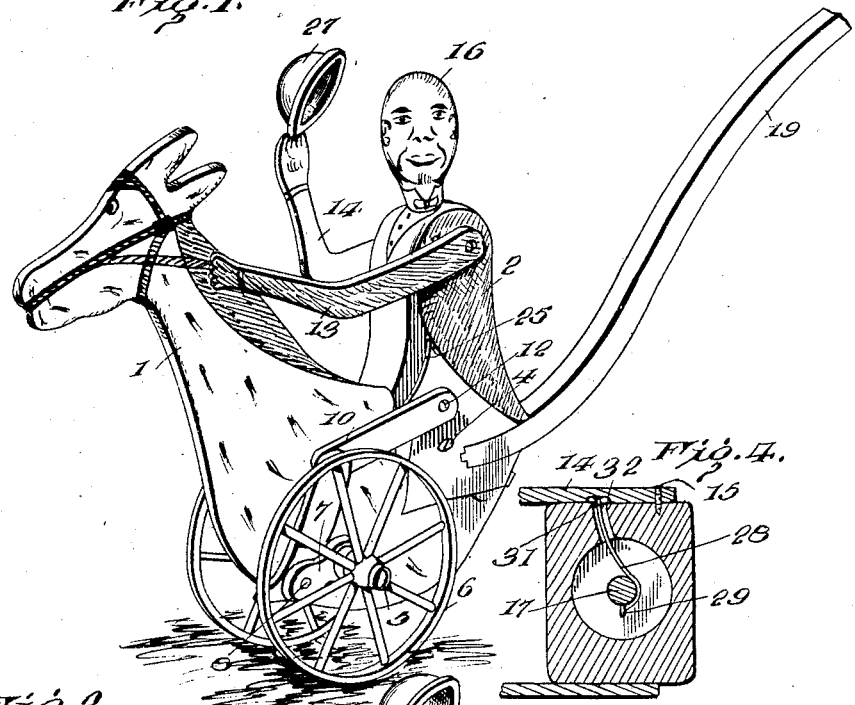
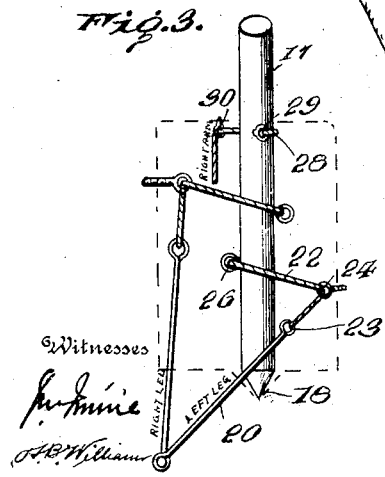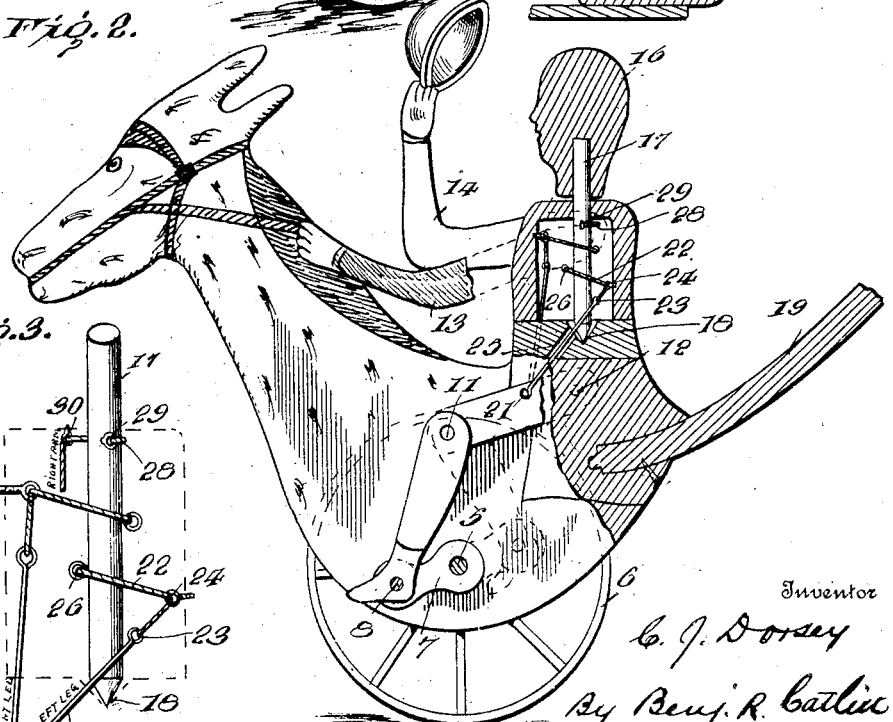
Inventor  
C. J. Dorsey  
By Benj. R. Catlin  
Attorney

UNITED STATES PATENT OFFICE.

CHARLES J. DORSEY, OF BALTIMORE, MARYLAND.

TOY.

No. 833,157.  Specification of Letters Patent.  Patented Oct. 16, 1906.

Application filed October 20, 1904. Serial No. 229,249.

*To all whom it may concern:*

Be it known that I, CHARLES J. DORSEY, a resident of Baltimore, State of Maryland, have invented certain new and useful Improvements in Toys; and I do hereby declare the following to be a full, clear, and exact description of the invention, such as will enable others skilled in the art to which it pertains to make and use the same.

The invention relates to wheeled toys, and has for its object to provide simple and economical means of amusement.

The invention consists in the construction hereinafter described and pointed out.

In the accompanying drawings, which form a part of this specification, Figure 1 is a perspective view of the toy. Fig. 2 is a side elevation, partly in section. Fig. 3 is a diagrammatic view of the operating connections, and Fig. 4 is a sectional detail.

Numeral 1 denotes a donkey, horse, or other animal, and 2 a clown or other rider, the particular character of these representations being immaterial.

At 3 the figure of the rider and horse overlap, and the two are secured together by a pin 4 or by screws.

5 denotes an axle having a bearing in the body of the horse and provided with wheels 6. Fixed to said axle are cranks 7, and pivoted to each of these is the lower part of the rider's leg, pivots being denoted by 8. The upper part of each leg is denoted by 10, and 11 represents pivots loosely connecting the leg parts. The upper leg parts are pivoted to the body of the rider at 12.

13 denotes a fixed arm, and 14 an arm pivotally connected to the right shoulder of the rider. A pivot connection between the upper right arm and the shoulder is denoted at 15.

16 indicates the head of the rider. It is rotatably supported on the body by a pin or shaft 17 fixed thereto and stepped in a suitable bearing 18. This shaft 17 and the head are caused to turn alternately to the right and left by means of flexible connections transmitting power from the axle, which, together with the wheels, can be propelled by a suitable handle 19.

20 denotes a wire fixed to the thigh or upper leg at 21, and 22 is a cord connected thereto at 23 and slipping freely through an eye 24, secured to the body of the rider within a chamber formed therein, said wire passing through the body into the chamber, as indicated at 25 in Fig. 1. The cord 22 is fixed to shaft 17 at 26. Each leg has similar connections, so that when the wheel-axle is rotated, with the effect to turn down a crank-arm 7, the wire and cord corresponding thereto will pull on the shaft 17 in manner to turn it and the head fixed thereon toward the particular side on which the said crank is situated. By these means the head will be turned alternately to the right and left.

To the hand of the movable arm is fixed a cap 27. This is placed on the head of the rider and removed once for every rotation of the wheel-axis by means of a cord 28, fixed to shaft 17 at 29 and slipping through an eye 30, secured to the body. The other end of the cord is fixed to the upper right arm by a screw-eye 31, the head of which preferably extends into a slot 32 in the arm. The movement of the axle, legs, and cranks winds the cord 28 oppositely in alternation to effect the removal and return of the cap.

Having thus described the invention, what I claim is—

1. In a toy, wheels running on the ground, the wheel-axle having a crank-arm rotating with the wheels, the figure having a leg member consisting of two parts pivoted to each other, one part being pivoted to the crank and the other to the body of the figure, the oscillating head for the figure, a pivotal support for the head, and means connecting the leg and support whereby the rotation of the axle turns the head horizontally.

2. In a toy comprising wheels, a wheel-axle and crank-arm, a figure having a body and an oscillating head, a pivoted member provided with a hand and cap, and devices for turning the head horizontally with respect to the body, said devices comprising a shaft fixed to the head and a connection between the shaft and said pivoted member whereby the cap is alternately placed on and removed from the oscillating head.

3. In a toy, the figure of an animal, a pair of wheels having axle-bearings in said figure, the figure of a rider fixed to the animal figure above the wheels, a handle for pushing the wheels, the axle crank-arm, a jointed leg pivoted to said crank-arm, a rotatable head-supporting spindle, and connections between the leg and spindle whereby the former rotates the latter.

4. In a toy, the figure of an animal, a pair of wheels having axle-bearings in said figure, the figure of a rider fixed to the animal figure above the wheels, a handle for pushing the wheels, the axle crank-arm, a jointed leg pivoted to said crank-arm, a rotatable head-supporting spindle, connections between the leg and spindle whereby the former rotates the latter, and a movable arm operatively connected to said spindle.

In testimony whereof I have signed this specification in the presence of two subscribing witnesses.

CHARLES J. DORSEY.

Witnesses:
C. M. CATLIN,
BENJ. R. CATLIN.